United States Patent [19]
Khanpara et al.

[11] Patent Number: 5,918,474
[45] Date of Patent: Jul. 6, 1999

[54] FAN MOTOR ON/OFF CONTROL SYSTEM FOR A REFRIGERATION APPLIANCE

[75] Inventors: Jatin C. Khanpara, Pune, India; Ernest C. Pickles, Evansville, Ind.

[73] Assignee: Whirlpool Corporation, Benton Harbor, Mich.

[21] Appl. No.: 08/893,109

[22] Filed: Jul. 15, 1997

Related U.S. Application Data

[60] Provisional application No. 60/023,130, Jul. 30, 1996.
[51] Int. Cl.$^6$ .............................. F25D 17/00; F25B 39/04
[52] U.S. Cl. .................................................. 62/179; 62/183
[58] Field of Search .............................. 62/179, 180, 231, 62/188; 236/37, 11

[56] References Cited

U.S. PATENT DOCUMENTS

| | | | |
|---|---|---|---|
| 2,765,630 | 10/1956 | Shaw | 62/229 X |
| 3,762,178 | 10/1973 | Yamada et al. | |
| 3,924,416 | 12/1975 | Durdin. | |
| 3,998,068 | 12/1976 | Chirnside. | |
| 4,094,166 | 6/1978 | Jerles. | |
| 4,493,194 | 1/1985 | Briccetti. | |
| 4,672,816 | 6/1987 | Takahashi. | |
| 4,860,552 | 8/1989 | Beckey. | |
| 4,949,548 | 8/1990 | Meyer. | |
| 5,142,880 | 9/1992 | Bellis. | |
| 5,582,233 | 12/1996 | Noto | 62/231 X |

*Primary Examiner*—William Wayner
*Attorney, Agent, or Firm*—Robert O. Rice; Joel Van Winkle; Stephen D. Krefman

[57] ABSTRACT

A refrigeration appliance and control system for efficiently operating the evaporator and condenser fan motors of the refrigeration appliance to reduce the total energy consumed by the appliance are disclosed. The control system operates to turn the evaporator fan motor on only after the evaporator has cooled to its operating temperature to avoid premature and inefficient use of the evaporator fan motor. The control system also permits the evaporator fan motor to continue running after the compressor is turned off to utilize the residual cooling capacity of the evaporator. In an embodiment, a secondary control system also operates to turn a condenser fan motor on only after the condenser reaches its operating temperature and operates to turn the condenser fan motor off only after the compressor is turned off and the condenser cools to a shutoff temperature below its operating temperature. The control systems may operate to delay the normal operation of the evaporator and condenser fan motors to provide for their most efficient use. The delay in operation may be determined by predetermined time intervals with respect to activation and deactivation of the compressor of the refrigeration appliance or may be determined by measuring the temperatures of the evaporator and condenser with appropriate sensors. Methods of operating the refrigeration appliance, and control system for efficient use of the evaporator and condenser fan motors are also disclosed.

16 Claims, 3 Drawing Sheets

FAN MOTOR ON/OFF CONTROL SYSTEM FOR A REFRIGERATION APPLIANCE

This application claims the benefit of U.S. Provisional Application No. S/N 60/023,130 filed on Jul. 30, 1996.

BACKGROUND OF THE INVENTION

1. Field of the Invention

The present invention relates to a control system and methods of operating a refrigeration appliance for controlling the operation of the fan motors for the evaporators and/or condensers of the refrigeration circuit to reduce the total energy consumed by the refrigeration appliance.

2. Description of the Related Art

Refrigeration appliances usually include a control system which determines the temperature of an interior compartment of the refrigeration appliance and turns the compressor of the refrigeration circuit on when cooling of the compartment is required. After the compartment is sufficiently cooled, the control system turns the compressor off. In a typical refrigeration appliance, the compressor is electrically connected to an evaporator fan motor for circulating air over the evaporator and into the interior compartment of the appliance, when the compressor is turned on. In such a system, the compressor and the evaporator fan motor are simultaneously turned on when cooling is required and simultaneously turned off when cooling is no longer required. The compressor may also be electrically connected to a condenser fan which is simultaneously turned on and off with the compressor for circulating air over and removing heat from the condenser of the appliance.

Such conventional refrigeration appliances suffer from certain inefficiencies and an important aspect of this invention lies in recognizing, and providing a solution for overcoming, such inefficiencies. For example, in a conventional cycle, the compressor and evaporator fan motor are turned on simultaneously but there is little or no benefit to circulating air over the evaporator until after the compressor has operated for a sufficient time interval for the evaporator to reach its cooled operating temperature. In addition, the compressor and evaporator fan motor are turned off simultaneously and the cooling capacity of the evaporator, which has been cooled to its operating temperature, is not utilized and is simply allowed to dissipate as warm refrigerant migrates from the condenser into the evaporator.

In a conventional cycle, the compressor and condenser fan motor are also turned on simultaneously but there is little or no benefit to circulating air over the condenser until after the compressor has operated for a sufficient time interval for heat to build up in the condenser. In addition, after the compressor and condenser fan motor are turned off simultaneously, no air is circulated over the condenser to draw heat off of the condenser while it is at its peak temperature.

Accordingly, it would be an improvement in this art if there were provided a control system which would avoid the inefficiencies of operating the evaporator fan before the evaporator reaches its operating temperature and which would utilize the cooling capacity of the evaporator after the compressor is turned off instead of allowing that cooling energy to dissipate. In addition, it would be an improvement in this art if there were provided a control system which would avoid the inefficiencies of operating the condenser fan before the condenser reaches its operating temperature and which would still provide air circulation over the condenser to draw heat off of it even after the compressor has been turned off.

SUMMARY OF THE INVENTION

The present invention provides a refrigeration appliance and control system for delaying operation of the evaporator fan motor until after the evaporator has cooled to or near its operating temperature and delaying deactivation of the evaporator fan motor after the compressor is turned off to take advantage of residual cooling capacity of the evaporator. In addition, the present invention also provides a refrigeration appliance and control system for delaying operation of the condenser fan motor until after the condenser has reached or is near its operating temperature and delaying deactivation of the condenser fan motor to continue to draw heat off of the condenser even after the compressor is turned off.

In one embodiment, the refrigeration appliance of this invention includes at least one interior compartment and a refrigeration circuit having a compressor, a condenser and at least one evaporator. Air circulation means are provided for circulating air over the evaporator and into the interior compartment. To activate the refrigeration circuit, compressor control means are provided for turning the compressor on when cooling is required in the compartment so that refrigerant is circulated through the circuit and the evaporator is cooled to an operating temperature. The compressor control means also turns the compressor off when cooling is no longer required in the compartment.

To provide for most efficient use of the air circulation means, control means are provided for turning the air circulation means on only after the evaporator has cooled to or near its operating temperature, which prevents premature and inefficient use of the air circulation means, such as an evaporator fan motor. In addition, the control means is provided for turning the air circulation means off only after the cooling capacity of the evaporator has been utilized, which occurs once the compressor is turned off and the evaporator warms to a shutoff temperature above its operating temperature. The operation of the control means may be determined by predetermined time intervals with respect to when the compressor is activated or deactivated, or may be determined by measuring the temperature of the evaporator.

In one embodiment, the control means operates to turn the air circulation means on at a first predetermined time interval after the compressor is turned on and operates to turn the air circulation means off a second predetermined time interval after the compressor is turned off. The first and second predetermined time intervals may be empirically determined. However, it is believed that time intervals of about 30 to 120 seconds are sufficient for the most efficient use of the air circulation means, with a first time interval of about 60 seconds and a second time interval of about 90 seconds being preferred.

In an alternate embodiment, the control means includes sensor means for determining the evaporator temperature. In such an embodiment, the control means operates to turn the air circulation means on after the compressor is turned on and the sensor means determines that the evaporator has cooled to its operating temperature and operates to turn the air circulation means off after the compressor is turned off and the sensor means determines that the evaporator temperature had warmed to a shutoff temperature above the operating temperature. Usually, the shutoff temperature will be about equal to the temperature inside the compartment of the refrigeration appliance since no further benefits are derived from operating the air circulation means after the evaporator and compartment temperatures are equalized.

In an embodiment, the refrigeration appliance also includes condenser air circulation means for circulating air over and removing heat from the condenser. In such an embodiment, the refrigeration appliance also includes secondary control means for turning the condenser air circulation means on only after the condenser has warmed to its operating temperature, which prevents premature and inefficient use of the condenser air circulation means. The secondary control means are also provided for turning the condenser air circulation means off after the condenser cools to a shutoff temperature below the condenser operating temperature. The operation of the secondary control means may be determined by predetermined time intervals with respect to operation of the compressor, or may be determined by measuring the temperature of the condenser.

In one embodiment, the secondary control means operates to turn the condenser air circulation means on a first predetermined time period after the compressor is turned on and operates to turn the condenser air circulation means off a second predetermined time period after the compressor is turned off. The first and second predetermined time periods may be empirically determined. However, it is believed that the first and second time periods should generally fall within a range of 30 to 120 seconds, with a first predetermined time period of about 60 seconds and a second predetermined time period of about 90 seconds being preferred.

In an alternate embodiment, the secondary control means includes a condenser sensor means for determining the temperature of the condenser. In operation, the secondary control means operates to turn the condenser air circulation means on after the compressor is turned on and the condenser sensor determines that the condenser has warmed to its operating temperature and operates to turn the condenser air circulation means off after the compressor is turned off and the condenser sensor determines that the condenser temperature has fallen to a shutoff temperature below the condenser operating temperature. Usually, the shutoff temperature will be about equal to ambient or room temperature.

In an embodiment, the refrigeration appliance includes a control system which sends signals to activate the compressor and evaporator and condenser fan motors when cooling is required in the refrigeration compartment sending signals to deactivate and the compressor and fan motors when cooling is no longer required in the compartment. However, the control system also includes delay means for delaying such signals and optimizing the operation of the evaporator and condenser fan motors. In particular, the delay means delays activation of the evaporator fan motor until after the compressor is activated to permit the evaporator to cool to its operating temperature before the evaporator fan motor is activated. The delay means also delays deactivation of the evaporator fan motor until after the compressor is deactivated to permit the evaporator fan motor to circulate air over the evaporator and into the compartment until the evaporator warms to a shutoff temperature above the operating temperature. Secondary delay means may also be provided for delaying activation of the condenser fan motor until after the condenser reaches its operating temperature and delaying deactivation of the condenser fan motor so that the condenser fan motor continues to circulate air over and remove heat from the condenser even after the compressor is turned off. The operation of the delay means may be determined by predetermined time intervals with respect to operation of the compressor, or may be determined by measurement of the respective temperatures of the evaporator and condenser as previously described.

The present invention also includes methods of operating a refrigeration appliance and control system for efficient use of the evaporator and condenser fan motors to reduce the overall energy consumed by the refrigeration appliance.

Other objects, advantages, and features of the present invention will become apparent from the following description and drawings.

DESCRIPTION OF THE PREFERRED EMBODIMENTS

Figure 1:
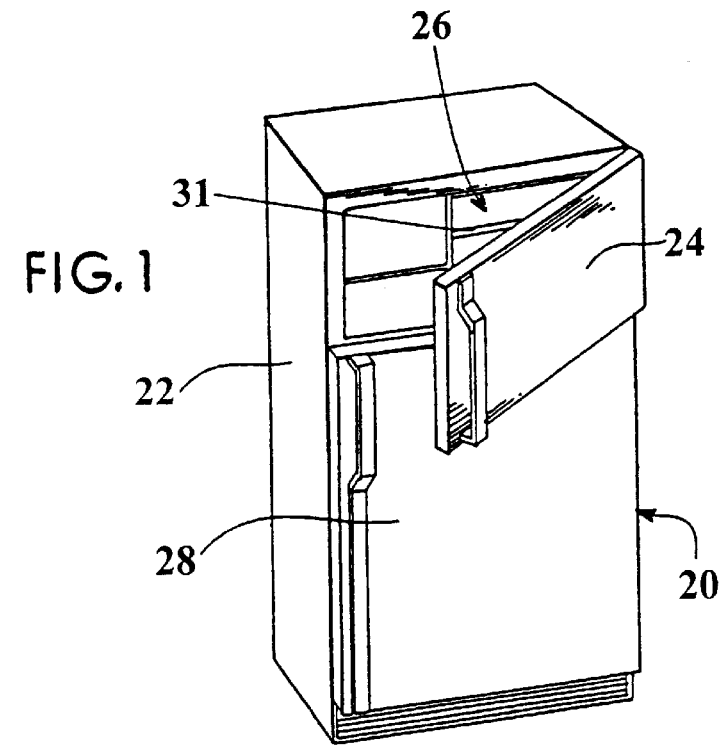
FIG. 1 is a perspective view of a refrigeration appliance embodying the principles of the present invention.
Figure 2:
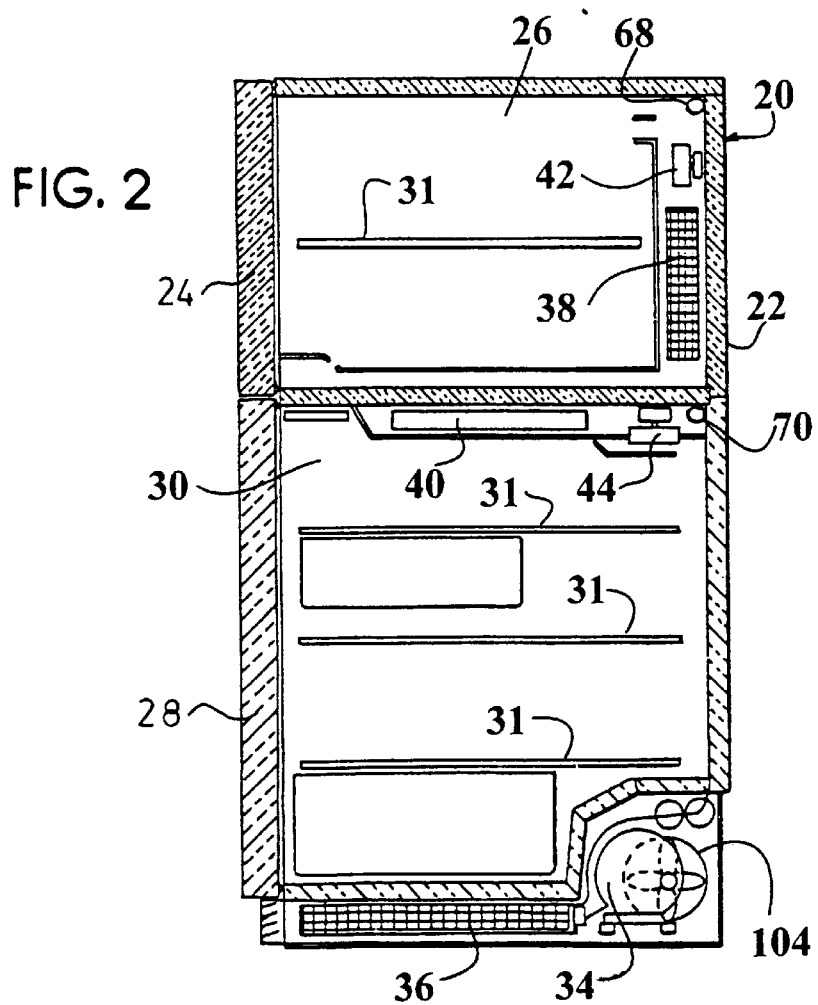
FIG. 2 is a side sectional view of the appliance of FIG. 1

In FIGS. 1 and 2 there is shown generally a refrigeration appliance at 20 which comprises an exterior cabinet 22 having a first openable door 24 to expose a first interior compartment 26 and a second operable door 28 to expose a second interior compartment 30. Within each of the compartments 26, 30 there may be one or more shelves 31 for receiving food articles. Generally one of the compartments 26, 30 will be maintained at a temperature sufficiently below 0° C. to assure that all of the articles contained within that compartment will be maintained in a frozen state. The other compartment generally is maintained somewhat above 0° C. to maintain the items placed therein in a chilled, but not frozen condition.

In order to maintain the compartments at the desired temperature levels, a refrigeration circuit 32 (FIG. 3) is provided which comprises a motor driven compressor 34, a condenser 36, an evaporator 38 for the first compartment 26 and a second evaporator 40 for the second compartment 30. Appropriate motor driven air moving devices 42, 44 such as fans or blowers are provided for circulating air within each of the compartments past its respective evaporator to maintain a fairly consistent temperature throughout each compartment.

Figure 3:
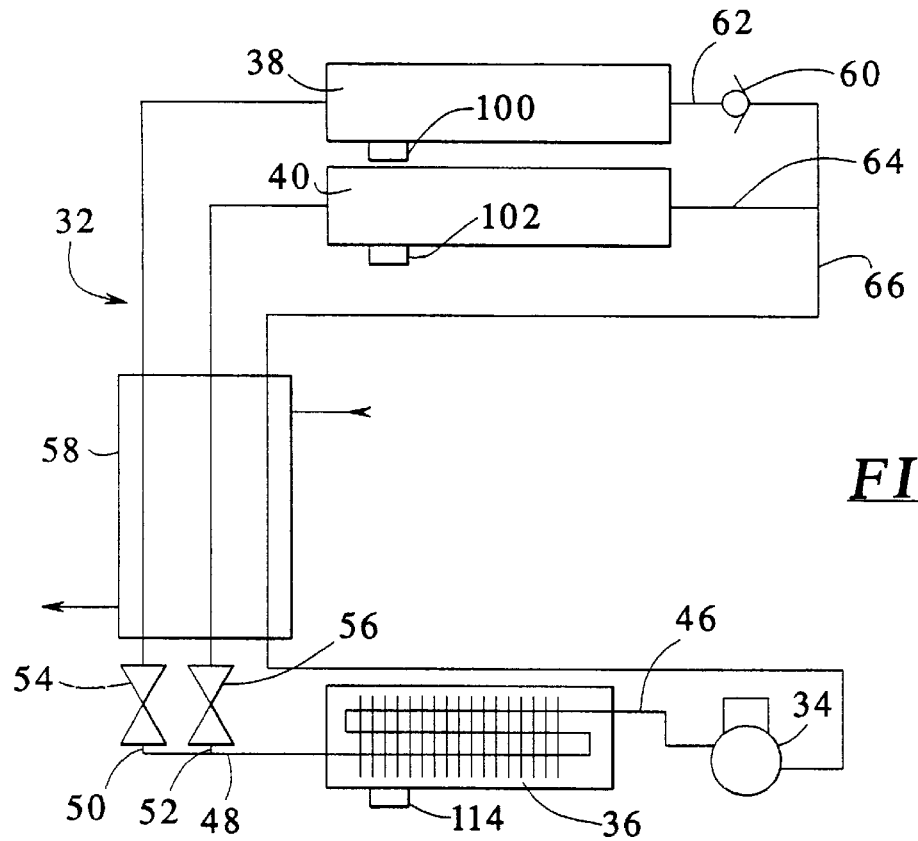
FIG. 3 is a schematic view of one embodiment of a refrigeration circuit that may be employed with the present invention.

In FIG. 3, one embodiment of the refrigeration circuit 32 is schematically illustrated. In this embodiment the single compressor 34 supplies refrigerant through line 46 to the condenser 36. Refrigerant then flows out of the condenser in line 48 and is presented to parallel lines 50, 52 each of which are supplied with an individual latching type solenoid valve 54, 56. The solenoid valves 54 and 56 should preferably be the latching type which requires power for a brief moment (a fraction of a second) to change position from open to closed or vice versa. If the latching type valves are not used, then the valve 54 should be a normally closed type and the valve 56 should also preferably be a normally closed type but the normally open type can be used too. Lines 50 and 52 pass through a heat exchanger 58 towards evaporators 38 and 40 respectively. A check valve 60 is provided on suction line 62 which exits from evaporator 38. Suction line 64 which exits from evaporator 40 has no such valve. Lines 62 and 64 join in a return suction line 66 which also passes through the heat exchanger 58 on its return to the compressor 34. While one embodiment of the refrigeration circuit 32 has been described in detail for purposes of illustration, it will be understood by those skilled in the art that refrigeration circuit 32 may take the form of any one of a number of well known refrigeration circuits commonly used in refrigeration appliances.

Figure 4:
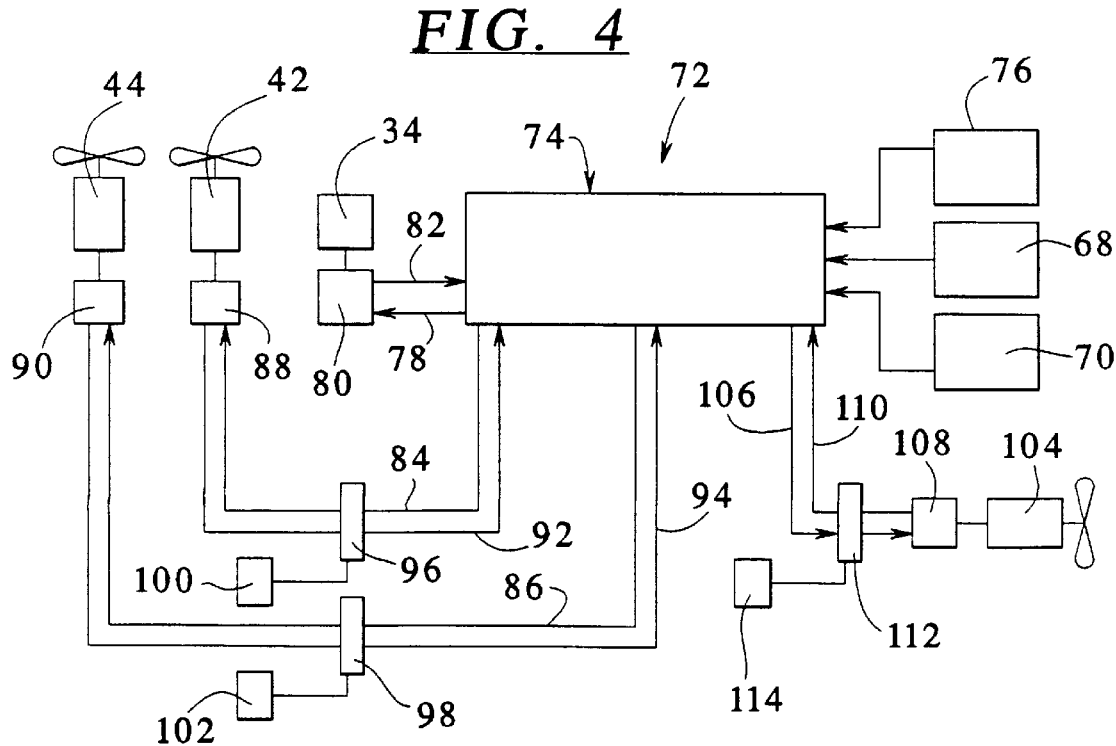
FIG. 4 is a schematic block diagram of the microprocessor control system of the present invention.

Referring to FIGS. 2 and 4, a temperature sensor 68, 70 is provided for each compartment 26, 30 to provide appropriate signal inputs to a control system 72 for the appliance. In response to the signal inputs from the sensors 68 and 70, the control system 72 provides cooling to compartments 26 and/or 30 by activating the compressor 34 when cooling is required (i.e., when the compartment temperature exceeds a first predetermined temperature) and turns the compressor 34 off when cooling is no longer required (i.e., when the compartment temperature falls below a second predetermined temperature).

The control system 72 has a microprocessor 74 and a connected memory device 76 where various data used by the microprocessor 74 can be stored. The microprocessor 74 has a first output 78 for sending a signal out to a speed control device 80 which operates the compressor 34. The microprocessor 74 also has an input 82 for receiving a feedback signal from the speed control device 80 so that the operating speed of the compressor motor can be precisely controlled. In operation, the sensors 68 and 70 send appropriate signals to the microprocessor 74 so that it acts as a compressor activation means for turning the compressor 34 on when cooling is required and turning compressor 34 off when cooling is no longer required. When the compressor 34 is turned on, refrigerant flows through the refrigeration circuit 32 so that evaporators 38 and 40 are cooled to their respective operating temperatures for providing cooling to compartments 26 and 30, respectively.

In order to circulate air over the evaporators 38 and 40 and into the compartments 26 and 30 of the refrigeration appliance, the microprocessor 74 also includes outputs 84 and 86 for sending appropriate signals to speed control devices 88 and 90 for operating the evaporator fan motors 42 and 44, respectively, when cooling is required. The microprocessor 74 also has inputs 92 and 94 for receiving feedback signals from speed controllers 88 and 90, respectively, to assure that the fan motors 42 and 44 are operated at precise speeds. When the microprocessor 74 sends signals to turn the compressor 34 on or off, it also sends signals to turn the fan motors 42 and 44 on or off. However, in order to reduce the total energy consumed by the refrigeration appliance, control means are provided for delaying activation of the fans 42 and 44 until after compressor 34 is turned on to permit the evaporators 38 and 40 to reach their operating temperatures and for delaying deactivation of the fans 42 and 44 until after compressor 34 is turned off continue the circulation of air over the evaporators 38 and 40 to take advantage of their residual cooling capacity.

In the embodiment shown in the drawings, the control means take the form of delay circuits 96 and 98 which are connected to the inputs and outputs leading to speed controls 88 and 90 for fans 42 and 44, respectively. In operation, when sensors 68 and 70 send signals to microprocessor 74 that cooling is required, the microprocessor 74 sends an appropriate signal to turn on compressor 34 and sends appropriate signals to turn on fans 42 and 44. However, the delay circuits 96 and 98 operate to delay activation of fans 42 and 44 until evaporators 38 and 40 have cooled to their desired operating temperatures. In addition, when sensors 68 and 70 send signals to microprocessor 74 that cooling is no longer required, the microprocessor 74 sends an appropriate signal to turn off compressor 34 and sends appropriate signals to turn off fans 42 and 44. However, the delay circuits 96 and 98 operate to delay deactivation of fans 42 and 44 to take advantage of the residual cooling capacity present in the evaporators. The delay for activating or deactivating the fans 42 and 44 may be determined by predetermined time intervals or measuring the evaporator temperatures as described in more detail below.

In one embodiment, the delay circuits 96 and 98 are selected to turn on fans 42 and 44 a first predetermined time interval after the compressor 34 is turned on to allow the evaporators to cool to their operating temperatures. The delay circuits 96 and 98 are also selected to delay the fans 42 and 44 from being turned off a second predetermined time interval after the compressor is turned off to take advantage of the residual cooling capacity of the evaporators. The first and second predetermined time intervals may be determined empirically for particular refrigeration appliances. However, it is believed that a first predetermined time interval of about 30 to 120 seconds, preferably about 60 seconds, is sufficient for most evaporators to reach their operating temperatures to make most efficient use of the evaporator fans. It is also believed that a second predetermined time interval of about 30 to 120 seconds, preferably about 90 seconds, is sufficient to take advantage of the residual cooling capacity in the evaporators. Such a time interval also ensures that the evaporator fans 42 and 44 are turned off as the temperatures of the evaporators approach the compartment temperatures since no further cooling benefits are realized once the evaporator and compartment temperatures are equalized. The delay circuits 96 and 98 can be selected or adjusted to provide the desired delay and such delay circuits may take the form of any one of a number of conventional delay circuits which are commercially available. For example, the delay circuits may take the form of conventional electromechanical or electrical delay circuits.

In an alternate embodiment, the delay circuits 96 and 98 are connected to sensors 100 and 102 (FIGS. 3 and 4) which are connected to, or are in close association with the evaporators 38 and 40 for sending appropriate signal inputs to delay circuits 96 and 98. In operation, the microprocessor 74 and delay circuits 96 and 98 operate to turn the fans 42 and 44 on after the compressor 34 is turned on and the sensors 100 and 102 determine that the evaporators 38 and 40 have been cooled to the respective operating temperatures. Such operation avoids premature and inefficient use of the fans 42 and 44. The operating temperatures of the evaporators 38 and 40 will vary depending upon the particular refrigeration appliance. However, evaporators which are associated with freezer compartments typically have operating temperatures of about −10 to −30° C. and evaporators which are associated with refrigeration compartments typically have operating temperatures of about 0 to −10° C.

In operation of the foregoing embodiment, the microprocessor 74 and delay circuits 96 and 98 are also operable to turn the fans 42 and 44 off after the compressor 34 is turned off and the sensors 100 and 102 determine that the evaporators 38 and 40 have warmed to certain shutoff temperatures above their operating temperatures such that no further benefit is derived from circulating air over the evaporators. The shutoff temperatures of the evaporators 38 and 40 are generally about equal to the temperatures within the respective compartments 26 and 30 since no further benefits are derived as the evaporator and compartment temperatures are equalized. The specific temperatures at which the fans 42 and 44 are shutoff will vary considerably depending upon the particular refrigeration appliance. However, evaporators which are associated with a freezer compartment would generally reach a shutoff temperature about equal to the freezer compartment temperature at about −15 to −25° C.

and evaporators which are associated with a refrigeration compartment would generally reach a shutoff temperature about equal to the refrigeration compartment temperature of about 2 to 5° C.

The inventors have discovered that a refrigeration appliance which uses the control system of this invention consumes less total energy than conventional refrigeration appliances. To determine the energy savings, comparison tests were run between a conventional refrigerator and a refrigerator which includes the control system of this invention. Both tests used a conventional refrigeration appliance which was made by Whirlpool Corporation and which had a model number ED2ZPKXBW01. The first refrigerator ("Conventional Refrigeration Appliance No. 1") was unmodified and refrigerator 2 ("Modified Refrigeration Appliance No. 2") incorporated the control system of this invention. Six (6) tests with each appliance were conducted to determine the average kilowatt per 24 hours consumed by each refrigerator. The test results for Refrigeration Appliance 1 are shown below:

| CONVENTIONAL REFRIGERATION APPLIANCE NO. 1 | | | | | |
|---|---|---|---|---|---|
| Test No. | FC | RC | DELTA | % RT | kwh/24 |
| 1 | −1.5 | 39.8 | 41.3 | 59.1 | 2.143 |
| 2 | −1.4 | 39.9 | 41.3 | 59.2 | 2.142 |
| 3 | −1.6 | 39.7 | 41.3 | 59.3 | 2.127 |
| 4 | −1.5 | 39.8 | 41.3 | 58.6 | 2.097 |
| 5 | −1.4 | 39.8 | 41.1 | 58.8 | 2.103 |
| 6 | −1.3 | 39.7 | 41 | 58.2 | 2.108 |
| average | −1.45 | 39.78 | 41.22 | 58.87 | 2.120 |

In all of the tests, "FC" represents the freezer compartment temperature in degrees Fahrenheit, "RC" represents the refrigeration compartment temperature in degrees Fahrenheit, "DELTA" represents the difference between the temperatures of the freezer and refrigeration compartments, "%RT" represents the percent run time which compares the time the compressor is running to the time the compressor is off, and "kwh/24" represents kilowatts consumed per 24 hours.

Refrigeration Appliance No. 2 was modified to include control means for turning the fan motors 42 and 44 on first predetermined time interval of 60 seconds after the compressor was turned on and for turning the fan motors 42 and 44 off a second predetermined time interval of 90 seconds after the compressor was turned off. The test results for Refrigeration Appliance No. 2 are shown below:

| MODIFIED REFRIGERATION APPLIANCE NO. 2 | | | | | |
|---|---|---|---|---|---|
| Test No. | FC | RC | DELTA | % RT | kwh/24 |
| 1 | −1.2 | 39.8 | 41 | 58.2 | 2.101 |
| 2 | −1.3 | 39.9 | 41.2 | 58.3 | 2.100 |
| 3 | −1.1 | 39.6 | 40.7 | 56.3 | 2.040 |
| 4 | −1 | 39.7 | 40.7 | 56.7 | 2.040 |
| 5 | −1 | 39.7 | 40.7 | 57.2 | 2.071 |
| 6 | −1.2 | 39.6 | 40.8 | 55.9 | 2.036 |
| average | −1.45 | 39.71667 | 40.85 | 57.1 | 2.065 |

The foregoing comparison tests establish that Modified Refrigeration Appliance No. 2 had a lower percentage of compressor running time (57.1%) compared to the compressor running time (58.87%) of Conventional Refrigeration Appliance No. 2. In addition, Modified Refrigeration Appliance No. 2 consumed significantly less energy of 2.065 kilowatts per 24 hours as compared to 2.120 kilowatts per 24 hours for the Conventional Refrigeration Appliance No. 1. The difference represents a 2.610% energy savings. When that percentage is adjusted to accommodate for the differences in the freezer compartment temperatures, the energy saving is of 2.293. When it is adjusted to accommodate for ambient temperature differences, the final percentage of energy savings is 2.277%. In the refrigeration industry, a 2.277% savings in total energy consumed by a refrigeration appliance is very significant and represents a substantial improvement over conventional refrigeration appliances.

The inventors have also discovered that further energy savings can be obtained by using a similar control means in connection with the air circulation means for circulating air over the condenser 36. In particular, referring to FIG. 2, a condenser air circulation means 104 such as a fan or blower is positioned to circulate air over and remove heat from condenser 36. Referring to FIG. 4, the microprocessor 74 includes an output 106 for sending appropriate signals to a speed control device 108 to operate condenser fan motor 104 and includes an input 110 for receiving feedback signals from the speed controller 108 to assure that the fan motor 104 is operated at precise speeds. When the microprocessor 74 sends appropriate signals to turn on compressor 34 and fans 42 and 44, it also sends appropriate signals to turn on the condenser fan 104 to circulate air over and remove heat from condenser 36. However, in order to reduce the total energy consumed by the refrigeration appliance, secondary control means are provided for delaying activation of condenser fan motor 104 until after the condenser 36 has reached its operating temperature and for delaying deactivation of the condenser fan motor 104 until after the compressor 34 is turned off to continue to remove heat from the condenser 36. The delay for activating or deactivating the condenser fan 104 may be determined by a predetermined time interval or by measuring the condenser temperature as described in more detail below.

In one embodiment, the secondary control means takes the form of a delay circuit 112 for delaying operation of the condenser fan 104 a first predetermined time period after the compressor 34 is activated to allow condenser 36 to reach its operating temperature. The delay circuit also delays the condenser fan 104 from being turned off until a second predetermined time period after the compressor is turned off to continue to remove heat from the condenser 36 after the compressor 34 is turned off. The first and second predetermined time periods may be empirically determined depending upon the particular refrigeration appliance. However, it is believed that a first predetermined time period of about 30 to 120 seconds, preferably about 60 seconds, is a sufficient time period for the condenser 36 to reach its operating temperature. It is also believed that a second predetermined time period about 30 to 120 seconds, preferably about 90 seconds, is a sufficient time period for the condenser fan 104 to remove the residual heat from the condenser 36. The delay circuit 112 can be selected or adjusted to provide the desired delay and such a delay circuit may take the form of any one of a number of conventional delay circuits which are commercially available.

In an alternate embodiment, the delay circuit 112 is connected to a sensor 114 which is connected to, or in close association with, condenser 36 as schematically shown in FIG. 3 for providing appropriate signal inputs to the delay circuit 112. In such an embodiment, the delay circuit 112 delays the condenser fan 104 from being turned on until after the sensor determines that the condenser 36 has reached its operating temperature. The delay circuit 112 also delays the condenser fan 104 from being turned off until after the condenser temperature has fallen to a shutoff temperature below its operating temperature. The condenser operating temperature will vary considerably depending upon the particular refrigeration appliance, but will generally fall in a range of about 40 to 50° C. The shutoff temperature should be significantly below the operating temperature of the condenser 36 and should preferably approach normal ambient or room temperatures of about 25 to 35° C. Once the condenser temperature approaches ambient temperature, there is little or no benefit to operating condenser fan 104.

Figure 5:
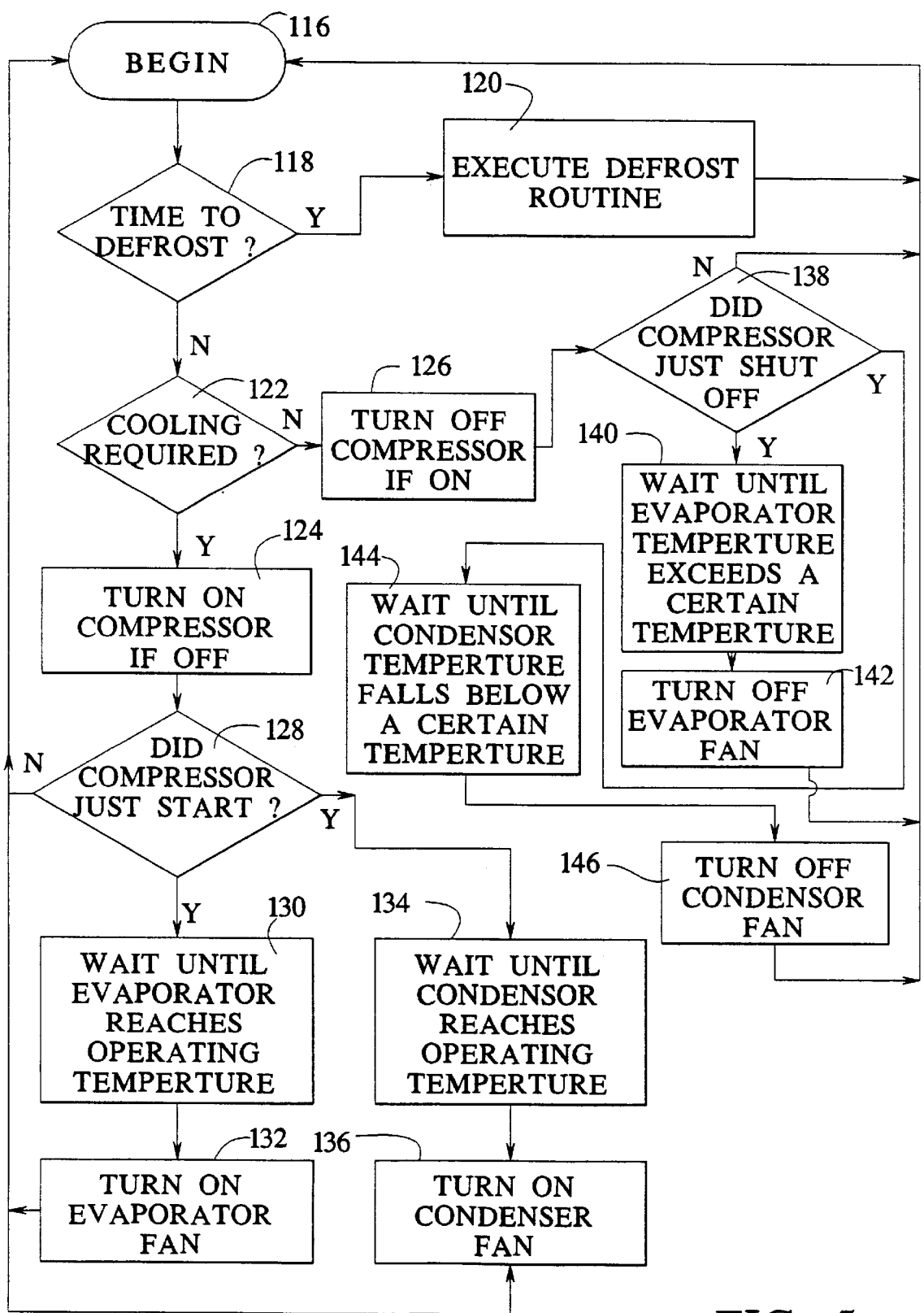
FIG. 5 is a flow chart schematically illustrating the methods embodying the present invention.

FIG. 5 illustrates a flow chart showing the control sequence of operating a refrigeration appliance and the fan motors in accordance with the methods of the present invention. As shown at 116, the control sequence has a beginning step to which all steps return. As shown at 118, the first step in the operation sequence is to determine if the refrigeration appliance should enter a defrost cycle and the control sequence executes a defrost routine as shown at 120 if it is time to run the defrost cycle. If it is not time to run the defrost cycle, the next step as shown at 122 is to determine if cooling is required in the compartments of the refrigeration appliance. If cooling is required, the compressor is turned on if it is off as shown at 124. If cooling is not required, the compressor is turned off if it is on as shown at 126.

If it is determined that cooling is required and the compressor is on, the next step is to determine if the compressor just started as shown at 128. If the compressor has not just started, the control sequence returns to the beginning at 116. If the compressor just started, the next step is to wait until the evaporator reaches its operating temperature as shown at 130 and then turn the evaporator fan on as shown at 134. As previously described, the waiting step shown at 130 may comprise waiting a predetermined time interval of about 30 to 120 seconds, preferably about 60 seconds, after the compressor is activated to turn the evaporator fan on, or may comprise using a sensor to determine if the evaporator has cooled to its operating temperature.

If it is determined that the compressor just started at 128, an additional or optional step is to wait until the condenser reaches its operating temperature as shown at 134 and then turn the condenser fan on as shown at 136. As previously described, the step of waiting until the condenser reaches its operating temperature as shown at 132 may comprise waiting a predetermined time interval of about 30 to 120 seconds, preferably about 60 seconds, after the compressor is turned on to turn the condenser fan on or may comprise using a sensor to determine if the condenser has reached its operating temperature.

If it is determined that cooling is not required at 122 and if the compressor is turned off at 126, the next step is to determine at 138 if the compressor just shut off. If the compressor did not just shut off, the cycle returns to the beginning at 116. If the compressor did just shut off, the next step is to wait until the evaporator temperature exceeds a certain temperature as shown at 140 and then turn the evaporator fan off as shown at 142. As previously described, the step of waiting until the evaporator temperature exceeds a certain temperature as shown at 140 may comprise waiting a second predetermined time interval of about 30 to 120 seconds, preferably about 90 seconds, after the compressor is turned off to turn off the evaporator fan, or may comprise measuring the evaporator temperature and determining if it exceeds the predetermined shutoff temperature. The shutoff temperature is preferably equal to about the compartment temperature of the refrigeration appliance so that the evaporator fan will be turned off once the temperatures of the evaporator and compartment are equalized.

If it is determined that the compressor has just shut off at 138, the control sequence includes the additional or optional steps of waiting until the condenser temperature falls below a certain temperature as shown at 144 and then turning the condenser fan off as shown at 146. As previously described, the step of waiting until the condenser temperature falls below a certain temperature as shown at 144 may comprise waiting a predetermined time period of about 30 to 120 seconds, preferably about 90 seconds, after the compressor is turned off to turn off the condenser fan motor, or may comprise measuring the temperature of the condenser and determining if it has fallen below a certain shutoff temperature. The condenser shutoff temperature is preferably equal to about room or ambient temperature since the benefits of operating the condenser fan diminish as the condenser temperature approaches ambient or room temperature.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

We claim:

1. A refrigeration appliance comprising:

at least one interior compartment;

a refrigeration circuit including a compressor, a condenser and at least one evaporator;

air circulation means for circulating air over said at least one evaporator and into said at least one interior compartment of the refrigeration appliance;

compressor control means for turning said compressor on when cooling is required in said at least one compartment so that said at least one evaporator is cooled to an operating temperature and for turning said compressor off when cooling is no longer required in said at least one compartment;

air circulation control means for turning said air circulation means on including delaying means for delaying activation of said air circulation means until after said compressor is activated to permit said at least one evaporator to cool to about said operating temperature;

a condenser air circulation means for circulating air over the condenser; and a secondary control means for turning said condenser air circulation means on after said compressor is energized to permit said condenser to warm to about a condenser operating temperature.

2. The refrigeration appliance according to claim 1 wherein said delaying means turns said air circulation means off after said compressor is deactivated to permit said at least one evaporator to warm to about a shutoff temperature above said operating temperature.

3. The refrigeration appliance according to claim 2 wherein said delaying means operates to turn said air circulation means on a first predetermined time interval after said compressor is turned on and operates to turn said air circulation means off a second predetermined time interval after said compressor is turned off.

4. The refrigeration appliance according to claim 3 wherein said first predetermined time interval is about 30 to 120 seconds and said second predetermined time interval is about 30 to 120 seconds.

5. The refrigeration appliance according to claim 4 wherein said first predetermined time interval is about 60 seconds and said second predetermined time interval is about 90 seconds.

6. The refrigeration appliance according to claim 2 wherein said delaying means includes sensor means for determining an evaporator temperature of said at least one evaporator and said control means operates to turn said air circulation means on after said compressor is turned on and said sensor means determines that said evaporator temperature has cooled to about said operating temperature and operates to turn said air circulation means off after said compressor is turned off and said sensor means determines that said evaporator temperature is about equal to said shutoff temperature.

7. The refrigeration appliance according to claim 6 wherein said shutoff temperature is about equal to a compartment temperature within said at least one compartment.

8. The refrigeration appliance according to claim 1 wherein said secondary control means operates to turn said condenser air circulation means on a first predetermined time period after siad compressor is turned on and operates to turn said condenser air circulation means off a second predetermined time period after said compressor is turned off.

9. The refrigeration appliance according to claim 8 wherein said first predetermined time period is about 30 to 120 seconds and said second predetermined time period is about 120 seconds.

10. The refrigeration appliance according to claim 8 wherein said first predetermined time period is about 60 seconds and said second predetermined time period is about 90 seconds.

11. The refrigeration appliance according to claim 1 wherein said secondary control means includes condenser sensor means for determining a condenser temperature of said condenser and said secondary control means operates to turn said condenser air circulation means on after said compressor is turned on and said condenser sensor means determines that said condenser temperature has warmed to about said condenser operating temperature and operates to turn said condenser air circulation means off after said compressor is turned off and said condenser sensor means determines that said condenser temperature has fallen to about said condenser shutoff temperature.

12. A control system for a refrigeration apparatus having at least one interior compartment, a compressor, a condenser, at least one evaporator, and air circulation means for circulating air over said at least one evaporator and into said at least one interior compartment, said control system comprising:

control means for sending signals to activate said compressor and said air circulation means when said interior compartment requires cooling and for sending signals to deactivate said compressor and the said air circulation means when the interior compartment no longer requires cooling;

delays means for delaying activation of said air circulation means until after said compressor is activated to permit said at least one evaporator to cool to about an operating temperature before said air circulation is activated a condenser air circulation means for circulating air over and removing heat from said condenser wherein said control means operates to send signals to activate said condenser air circulation means when said compressor is activated; and a secondary delay means for delaying activation of said condenser air circulation means until after said compressor is activated to permit said condenser to warm to a condenser operating temperature.

13. The control system according to claim 12 wherein said delay means are further provided for delaying deactivation of said air circulation means until after said compressor is deactivated and said at least one evaporator warms to about a shutoff temperature above said operating temperature.

14. The control system according to claim 12 wherein said secondary delay means are further provided for delaying deactivation of said condenser air circulation means until after said compressor is deactivated to permit said condenser air circulation means to circulate air over said condenser until said condenser cools to a shutoff temperature below said condenser operating temperature.

15. The method according to claim 12 including the further step of turning said air circulation means off after said at least one evaporator warms to a shutoff temperature above said operating temperature.

16. The method according to claim 12 wherein the delaying step further includes:

sensing the temperature of said at least one evaporator; and delaying energization of said air circulation means until said at least one evaporator has cooled to said operating temperature.

* * * * *